United States Patent
Jaber et al.

(10) Patent No.: US 8,874,922 B2
(45) Date of Patent: Oct. 28, 2014

(54) SYSTEMS AND METHODS FOR MULTI-LAYERED AUTHENTICATION/VERIFICATION OF TRUSTED PLATFORM UPDATES

(75) Inventors: Muhammed Jaber, Austin, TX (US); Mukund Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 292 days.

(21) Appl. No.: 13/351,872

(22) Filed: Jan. 17, 2012

(65) Prior Publication Data

US 2013/0185564 A1    Jul. 18, 2013

(51) Int. Cl.
 *H04L 9/32* (2006.01)
 *G06F 21/57* (2013.01)

(52) U.S. Cl.
 CPC .............. *G06F 21/572* (2013.01); *G06F 21/57* (2013.01)
 USPC ........... 713/176; 713/172; 713/153; 713/159; 713/186; 713/189; 726/22; 726/27

(58) Field of Classification Search
 CPC ......... G06F 21/57; G06F 21/64; G06F 21/65; G06F 21/44; G06F 21/53; G06F 21/572; G06F 21/575; H04L 63/06; H04L 63/12; H04L 63/123; H04L 63/126
 USPC ......... 713/1, 2, 153, 139, 172, 176, 185–189; 726/22, 27
 See application file for complete search history.

(56) References Cited

U.S. PATENT DOCUMENTS

| | | | |
|---|---|---|---|
| 2005/0021968 A1* | 1/2005 | Zimmer et al. | 713/176 |
| 2007/0186086 A1* | 8/2007 | Lambert et al. | 713/1 |
| 2007/0204144 A1* | 8/2007 | Gafken et al. | 713/2 |
| 2009/0276617 A1* | 11/2009 | Grell et al. | 713/2 |
| 2011/0258457 A1 | 10/2011 | Noehring et al. | |

OTHER PUBLICATIONS

Arnold, T.W. and L.P. Van Doorn, "The IBM PCIXCC: A new cryptographic coprocessor for the IBM eServer", IBM Journal of Resesarch and Development, vol. 48, No. 3/4, May/Jul. 2003, pp. 475-487.

* cited by examiner

*Primary Examiner* — Kambiz Zand
*Assistant Examiner* — Noura Zoubair
(74) *Attorney, Agent, or Firm* — Baker Botts L.L.P.

(57) ABSTRACT

In accordance with the present disclosure, a system and method for multilayered authentication of trusted platform updates is described. The method may include storing first cryptographic data in a personality module of an information handling system, with the first cryptographic data corresponding to a verified firmware component. A second cryptographic data may also be determined, with the second cryptographic data corresponding to an unverified firmware component. The unverified firmware component may be stored in a memory element of the information handling system, and the second cryptographic data may be determined using a processor of the information handling system. The method may further include determining if the first cryptographic data matches the second cryptographic data and updating firmware in the information handling system with the unverified firmware component if the first cryptographic data matches the second cryptographic data, and the unverified firmware component includes a digital signature of a manufacturer.

20 Claims, 3 Drawing Sheets

和州ATS AND METHODS FOR
MULTI-LAYERED
AUTHENTICATION/VERIFICATION OF
TRUSTED PLATFORM UPDATES

TECHNICAL FIELD

The present disclosure relates generally to the operation of computer systems and information handling systems, and, more particularly, to systems and methods for multi-layered authentication/verification of trusted platform updates.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include software and firmware components that need to be periodically updated, such as a system-wide basic input/output system ("BIOS") or component firmware. The updated software or firmware components are typically transmitted over a network medium to the operators of an information handling system, who must then update the software or firmware in the information handling system. In the case of the system BIOS, for example, an administrator of a network with multiple information handling systems typically must verify first that the update is authentic—that it is from the manufacturer—and second that the updated software or firmware does not contain any bugs or will not otherwise conflict with the network configuration. Once the updated software or firmware is verified, the administrator may place the updates on a list of approved updates. Unfortunately, existing technology does not prevent a user of the network or a local user of an information handling system from circumventing the network policies and updating the software or firmware components with unapproved updates. Such unapproved updates can lead to widespread network instability and network vulnerability.

SUMMARY

In accordance with the present disclosure, a system and method for multilayered authentication of trusted platform updates is described. The method may include storing first cryptographic data in a personality module of an information handling system, with the first cryptographic data corresponding to a verified firmware component. A second cryptographic data may also be determined, with the second cryptographic data corresponding to an unverified firmware component. The unverified firmware component may be stored in a memory element of the information handling system, and the second cryptographic data may be determined using a processor of the information handling system. The method may further include determining if the first cryptographic data matches the second cryptographic data and updating firmware in the information handling system with the unverified firmware component if the first cryptographic data matches the second cryptographic data, and the unverified firmware component includes a digital signature of a manufacturer.

The system and method disclosed herein is technically advantageous because it allows for multilayered authentication/verification of trusted platform updates. In contrast to existing technology, where trusted platform updates are digitally signed by the manufacturer of, for example, a system BIOS, the system and method described herein allows a network operator to add an additional level of cryptographically sound verification. Using the additional level of security, network administrators may prevent firmware updates of critical components that have not previously been tested and approved. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Hereinafter, embodiments will be described with reference to the drawings. Each drawing is a schematic view for describing an embodiment of the present disclosure and promoting the understanding thereof. The drawings should not be seen as limiting the scope of the disclosure. In each drawing, although there are parts differing in shape, dimension, ratio, and so on from those of an actual apparatus, these parts may be suitably changed in design taking the following descriptions and well-known techniques into account.

Figure 1:
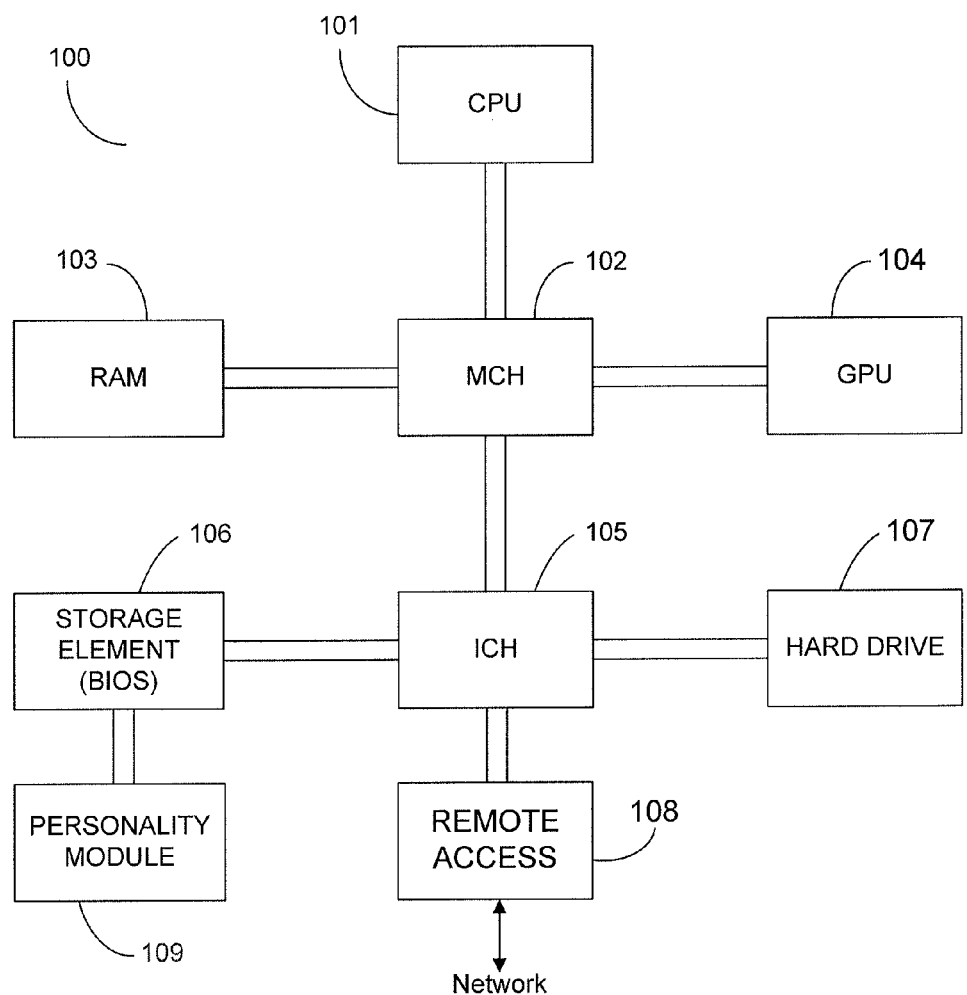
FIG. 1 is an example information handling system.

Shown in FIG. 1 is a block diagram of a typical information handling system 100. A processor or CPU 101 of the typical information handling system 100 is communicatively coupled to a memory controller hub or north bridge 102. Memory controller hub 102 may include a memory controller for directing information to or from various system memory components within the information handling system, such as RAM 103, storage element 106, and hard drive 107. The memory controller hub may be coupled to RAM 103 and a graphics processing unit 104. Memory controller hub 102 may also be coupled to an I/O controller hub or south bridge 105. I/O hub 105 is coupled to storage elements of the computer system, including a storage element 106, which may comprise a flash ROM that includes the BIOS of the computer system. I/O hub 105 is also coupled to the hard drive 107 of the computer system. I/O hub 105 may also be coupled to a remote access component 108, such as a remote access card that allows out-of-band management of the information handling system through a network. The remote access element may itself include a processor, a memory element, and software/firmware. Remote access of the information handling system 100 may be accomplished by logging into the remote access element 108 using authorization credentials, such as a network administrator logging in with role-based authorization credentials. The remote access element may comprise a Baseboard Management Controller (BMC), or a Remote Access Controller (RAC). Once remote access is completed, a network administrator, for example, may issue commands to elements of the information handling system 100 through the use of the processor and software/firmware within the remote access element. The information handling system 100 may also include a personality module 109.

The personality module 109 may comprise at least one memory component coupled to the flash ROM storage 106 and may include information specific to the information handling system. The personality module 109 may further include information specific to the BIOS of the information handling system, such as a boot order. In certain embodiments, the personality module may be included in the flash ROM storage 106 with a system BIOS. In certain other embodiments, the personality module 109 may be coupled directly to I/O hub 105. The above description of an information handling system should not be seen to limit the applicability of the system and method described below, but is merely offered as an example computing system. Moreover, the same or similar architecture discussed above may be found within multiple information handling systems of a network, such as a server network.

An operator of the information handling system 100, or a network administrator overseeing multiple information handling systems similar to information handling system 100 may receive updates to system software or firmware components through a network, such as the internet. The updates may include a new version of system BIOS, a new version of firmware for a memory controller, a new version of firmware for the remote access element, or an update to other software or firmware components well known in the art. Typically, the updates are transmitted from the manufacturer and signed with a digital signature. The digital signature includes data encrypted according to well known Public/Private Key cryptography schemes that incorporate RSA algorithms. Specifically, a manufacturer may "sign" the firmware update by encrypting a portion of the firmware with a confidential private key specific to the manufacturer and transmitting the digital signature to the customer along with the firmware update. A public key corresponding to the private key may be published to customers of the manufacturer, and the public key may be used to decrypt the digital signature to authenticate the firmware update.

Authenticating the firmware update is useful to ensure that the firmware update was in fact issued by the manufacturer, and not a malicious third party, but does not ensure that the firmware update is bug free or otherwise compatible with an information handling system or network configuration. Updating the information handling systems in a network before an administrator has sufficiently tested the update can cause significant instability, particularly if the firmware update is a system BIOS update. Currently, information handling system architecture does not afford a cryptographically-sound verification process for system firmware updates, such that a network user cannot circumvent network policies to update system firmware with unapproved updates.

Figure 2:
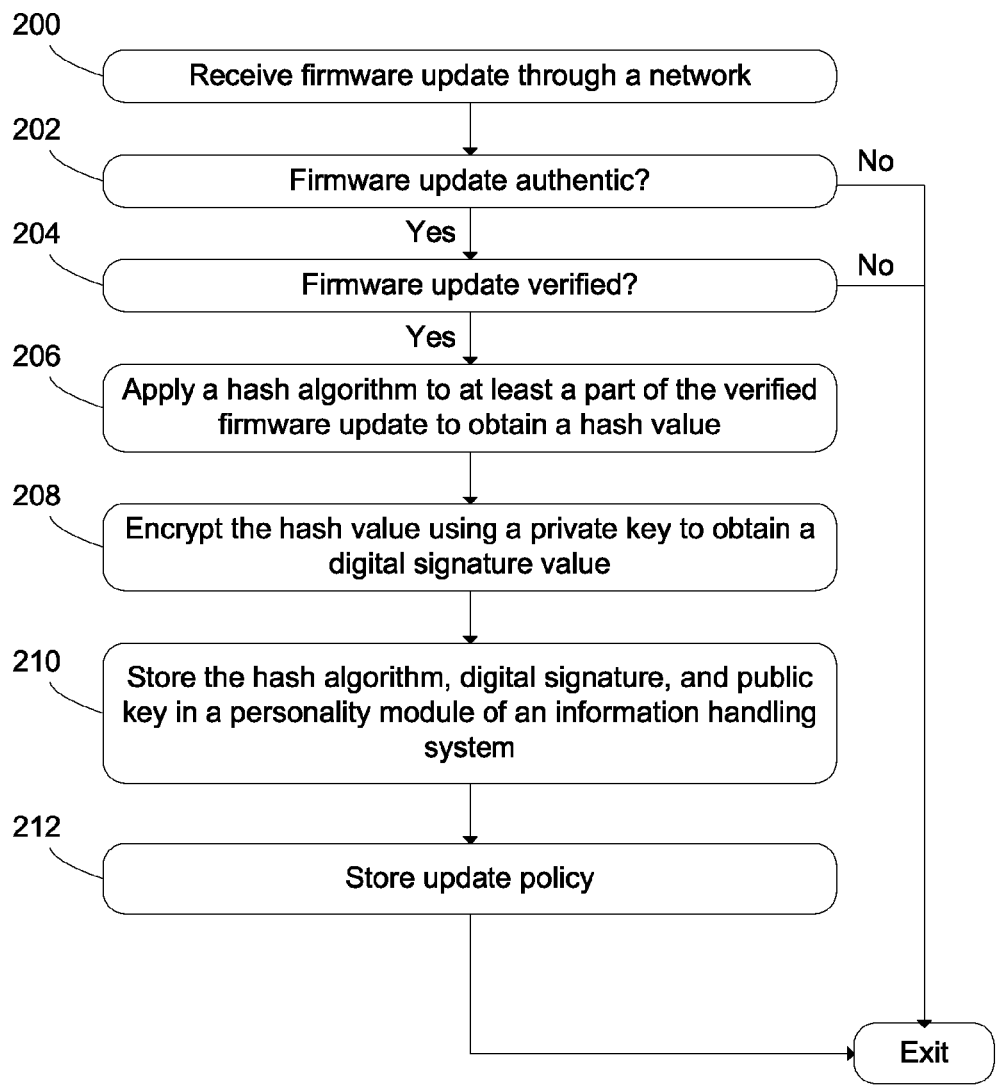
FIG. 2 illustrates an example verification method for firmware updates.

FIG. 2 illustrates an example process for multilayered authentication/verification of trusted platform updates, in which a network administrator using an information handling system in a network may prevent unapproved firmware updates in a cryptographically-sound manner. At step 200, a firmware update may be received through a network by a network administrator or may be received locally from a system user. In certain embodiments, the firmware update may comprise a system BIOS. In other embodiments, the firmware update may comprise, for example, BMC firmware. The firmware update may, for example, be downloaded from a website of the information handling system's manufacturer or from the website of a component manufacturer. The firmware update may be temporarily stored in a storage element of the information handling system, such as hard drive 107 from FIG. 1, while the authentication/verification process is undertaken.

Step 202 may include determining whether the firmware update is authentic. As previously described, this may include obtaining a digital signature of the firmware update and decrypting the digital signature with a public key of the system manufacturer. The decryption process may be accomplished using a processor in the information handling system. If the firmware update is not authentic, the process may end, because the firmware update was not sent from the manufacturer and may include malicious code. If the firmware update is authentic, then the process proceeds to step 204.

At step 204, a network administrator may verify the firmware update. The verification process may include software testing for bugs and erroneous code as well as compatibility with information handling system or network configuration. If the firmware update is not verified, the process may exit. If the firmware is verified, the process may proceed to steps 206 and 208, which may comprise the step of determining first cryptographic data of the verified firmware update.

Step 206 includes applying a hash algorithm to at least a portion of the verified firmware update using a processor in an information handling system. In certain embodiments, the portion of the verified firmware update may include all or part of the entire payload/code binary, such as a header file, of a system BIOS update or a BMC firmware update. The payload may comprise, for example, the firmware update in addition to a header file and other transmission and configuration information. In certain embodiments, the hash algorithm may be a previously defined hash algorithm, which may be applied to the all or part of the entire firmware payload/code binary, such as the header file. In other embodiments, the hash algorithm may be generated within the information handling system. Applying the hash algorithm results in a first hash value corresponding to the verified firmware update.

At step 208, a processor in the information handling system may receive the hash value and encrypt the hash value using a private key. Unlike the public/private keys used by the manufacturer to sign the firmware update, the hash value may be encrypted with a private key corresponding to the company/individual who owns the information handling system or manages the network. Encrypting the hash value using the private key results in a digital signature value corresponding to the verified firmware update. Notably, at this point in the process the firmware update will be digitally signed twice: once by the manufacturer and once by the company/individual who owns the information handling system or manages the network.

At step 210, a network administrator may execute commands to store in a personality module the hash algorithm, the digital signature, and a public key corresponding to the private key. In certain embodiments, the network administrator may remotely access all or some of the information handling systems in a network architecture through, for example, a remote access element such as remote access element 108 in FIG. 1. The network administrator may then issue commands causing the processors of all or some information handling systems in the network environment to store the hash algorithm, digital signature, and public key in each corresponding personality module. The hash algorithm, digital signature, and public key may comprise first cryptographic data. The first cryptographic data may correspond to the verified firmware update in that some or all of the first cryptographic data was used to encrypt/decrypt the verified firmware update or that some or all of the first cryptographic data is the result of encrypting/decrypting the verified firmware update.

In addition to the first cryptographic data, an update policy may be pushed to the personality module at step 212. The upgrade policy may reflect an additional limit on the ability of an information handling system user (local or network) to alter the firmware. For example, in the case of system BIOS, the update policy may dictate whether the system BIOS can be updated and downgraded at all, and if so, to which versions. A system BIOS may have a version number, such as A06. The version number may be located in a header file of the system BIOS. The update policy may, for example, allow an upgrade to a version A07, but not versions A08, and may also allow a downgrade to version A04 but not A05. Thus, the update policy allows an additional level of control which allows a network administrator to broadly identify which version of firmware may be updated, in addition to the cryptographic data which identifies whether a particular copy of the firmware is verified.

Figure 3:
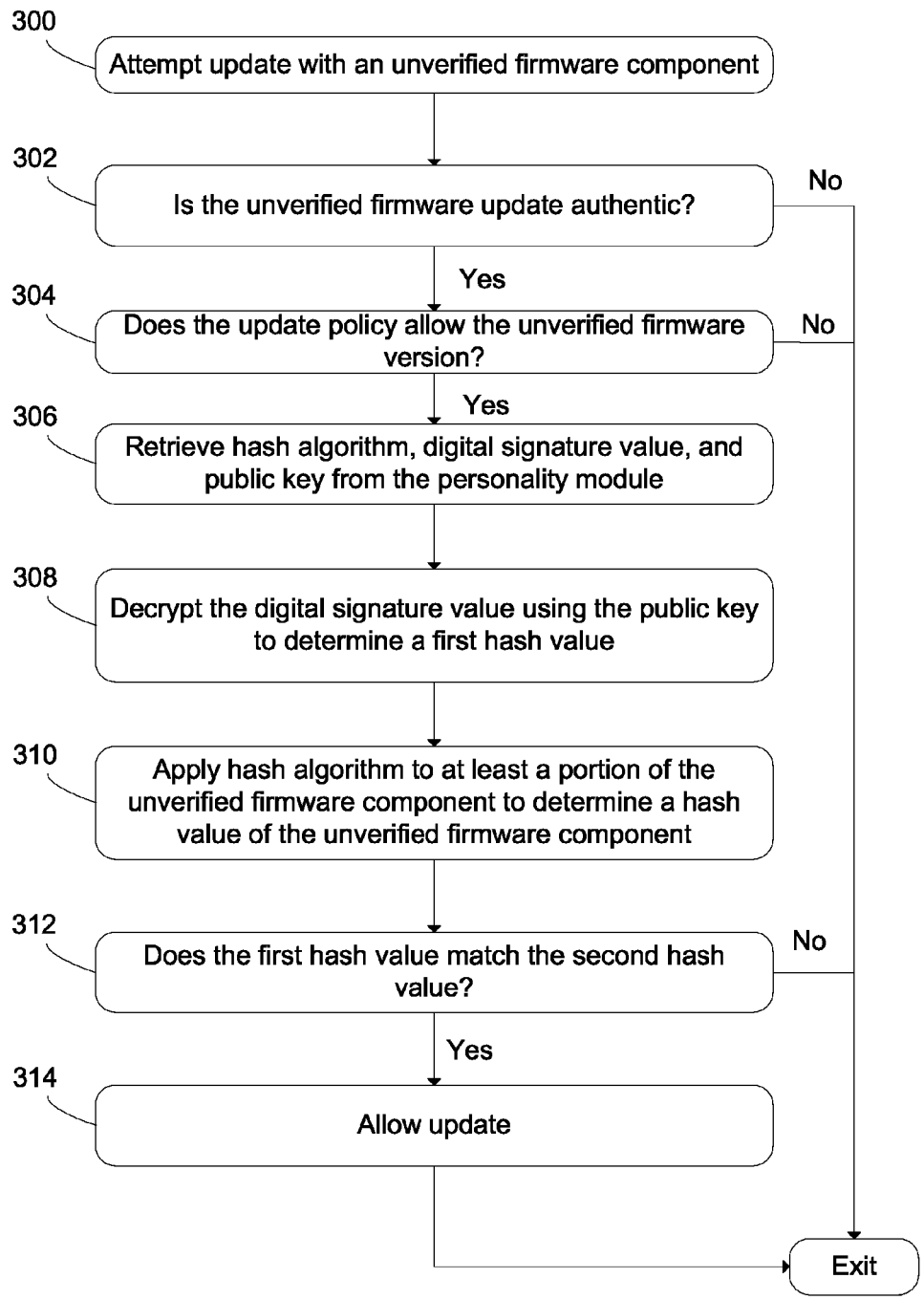
FIG. 3 illustrates an example verification method for firmware updates.

Once a personality module of an information handling system has been loaded with the first cryptographic data, the example process illustrated in FIG. 3 may prevent firmware updates using unverified firmware. At step 300, a user of an information handling system may attempt to update firmware in the information handling system. For example, a company employee using a network computer may acquire an updated system BIOS, store a copy of the system BIOS locally, and attempt to flash the updated system BIOS to a storage element in the information handling system, such as storage element 106 in FIG. 1. The user may also be using an information handling system locally, without network access. In certain embodiments, the existing BIOS of the information handling system may cause the verification process of steps 302 to 312 to commence in response to the update attempt.

At step 302, the information handling system may check that the firmware update is authentic. This process may be similar to the authentication process described with respect to FIG. 2. As the unverified firmware may be entirely different than the firmware previously verified, authenticating the unverified firmware ensures that the unverified firmware came from a trusted source, such as the manufacturer of the information handling system. If the unverified firmware update is not authentic, the process may exit, terminating the firmware update. If the unverified firmware update is authentic, the process continues to step 304.

At step 304, the version of the firmware may be checked against the update policy stored in the personality module of the information handling system. The update policy may be checked against the version of the unverified firmware to determine if an update to that particular version is allowed. For example, if the current system BIOS is of a version A06 and the unverified firmware is a system BIOS of version A07, the process will proceed to step 306 if the update policy allows an upgrade from version A06 to version A07. If the update policy does not allow an upgrade to version A07, the process will terminate and the update will fail.

At step 306, the existing system BIOS may cause a processor to retrieve from the personality module of the information handling system the first cryptographic data. As previously mentioned, the first cryptographic data may comprise the hash algorithm, the digital signature value, and the public key previously saved by the network administrator. At step 308, the processor may decrypt the digital signature value using the public key. The decryption may result in a first hash value, as the digital signature value resulted from the encryption of a previously determined hash value using a private key. All encryption and decryption and hashing described herein are computationally intensive operations that would be functionally impossible to complete without the use of a processing device.

In certain embodiments, the digital signature value may not be stored within the personality module. In such instances, the hash algorithm and public key may be stored in the personality module, with the digital signature value being transmitted with or appended to the updated system BIOS. Step 306 may then include retrieving from the personality module the hash algorithm and public key, and retrieving from the updated system BIOS file the digital signature value. Certain steps in FIG. 2 may be skipped in such embodiments, as the digital signature value would not need to be determined and stored within the personality module before firmware update can be verified.

At step 310, the processor may apply the hash algorithm stored in the personality module to at least a portion of the unverified firmware component. In certain embodiments, the unverified firmware component may be all or part of the entire firmware payload/code binary, such as a header file of an unverified system BIOS. A second hash value may result from applying the hash algorithm to the header file of the unverified system BIOS. If the unverified firmware component is the same as the verified firmware component, the second hash value will match the first hash value. In particular, because the same hash algorithm was used to generate the hash values, if the hash values match, then the data to which the hash algorithm was applied must be the same. If, at step 312, the hash values do not match, the unverified firmware component is not the same as the verified firmware component, and the update will fail. If, at step 312, the hash values do match, then the update will proceed at step 314.

The above is advantageous because it prevents untested and unauthorized firmware releases from being flashed to system memory, even though the firmware release may be from a trusted source. This provides network administrators the time to test and determine whether an upgrade to a particular version is worthwhile, and if so, to limit the upgrade to a particular copy of the new version via the cryptographic data. Only a copy of the firmware verified by the network administrator will generate the correct cryptographic data.

Although the present disclosure has been described in detail, it should be understood that various changes, substitutions, and alterations can be made hereto without departing from the spirit and the scope of the invention as defined by the appended claims.

What is claimed is:

1. A system incorporating multilayered authentication of trusted platform updates, comprising:
    a processor;
    at least one firmware component coupled to the processor;
    a first cryptographic data, wherein the first cryptographic data corresponds to a previously verified firmware component;
    a personality module coupled to the processor, wherein the personality module comprises information specific to a system BIOS comprising at least information related to boot order and wherein the personality module stores the first cryptographic data; and
    an update policy, wherein the update policy is pushed to the personality module, and wherein the update policy reflects additional limitations on updates to the at least one firmware component comprising at least allowable versions of upgrade updates and downgrade updates;
    wherein the processor:
        retrieves the first cryptographic data from a personality module,
        determines second cryptographic data, wherein the second cryptographic data corresponds to an unverified firmware component,
        determines if the first cryptographic data matches the second cryptographic data, and
        allows an update of the at least one firmware component with the unverified firmware component if:
            the first cryptographic data matches the second cryptographic data, and
            the unverified firmware component includes a digital signature of a manufacturer.

2. The system of claim 1, wherein the first cryptographic data comprises:
    a hash algorithm;
    a digital signature value, wherein the digital signature value comprises a first hash value encrypted with a private key, and wherein the first hash value is determined by applying the hash algorithm to the verified firmware component; and
    a public key corresponding to the private key.

3. The system of claim 2, wherein the second cryptographic data comprises a second hash value, wherein the second hash value is determined by applying the hash algorithm to the unverified firmware component.

4. The system of claim 3, wherein the first cryptographic data matches the second cryptographic data if the first hash value matches the second hash value.

5. The system of claim 4, wherein the at least one firmware component comprises a first basic input/output system ("BIOS"), the previously verified firmware component comprises a second BIOS, and unverified firmware component comprises a third BIOS.

6. The system of claim 5, wherein the first hash value is determined by applying the hash algorithm to at least part of the second BIOS payload, and wherein the second hash value is determined by applying the hash algorithm to at least part of the third BIOS payload.

7. The system of claim 4, wherein the at least one firmware component comprises a first baseboard management controller ("BMC") firmware, the previously verified firmware component comprises a second BMC firmware, and the unverified firmware component comprises a third BMC firmware.

8. The system of claim 7, wherein the first hash value is determined by applying the hash algorithm to at least part of the second BMC firmware payload, and wherein the second hash value is determined by applying the hash algorithm to at least part of the third BMC firmware payload.

9. A method for multilayered authentication of trusted platform updates, comprising:
    storing first cryptographic data in a personality module of an information handling system, wherein the first cryptographic data corresponds to a previously verified firmware component and wherein the personality module comprises information specific to a system BIOS comprising at least information related to boot order;
    pushing an update policy to the personality module, wherein the update policy reflects additional limitations on updates to the verified firmware component comprising at least allowable versions of upgrade updates and downgrade updates;
    determining second cryptographic data, wherein the second cryptographic data corresponds to an unverified firmware component, wherein the unverified firmware component is stored in a memory element of the information handling system, and wherein the second cryptographic data is determined using a processor of the information handling system;
    determining if the first cryptographic data matches the second cryptographic data; and
    updating firmware in the information handling system with the unverified firmware component if:
        the first cryptographic data matches the second cryptographic data, and
        the unverified firmware component includes a digital signature of a manufacturer.

10. The method of claim 9, further comprising the step of determining the first cryptographic data, wherein determining the first cryptographic data comprises the steps of:
    applying a hash algorithm to the verified firmware component to obtain a first hash value; and
    generating a digital signature value by encrypting the first hash value with a private key.

11. The method of claim 10, wherein the first cryptographic data comprises the hash algorithm, the digital signature value, and a public key corresponding to the private key.

12. The method of claim 11, wherein determining the second cryptographic data the cryptographic data comprises the steps of:
    retrieving the hash algorithm from the personality module, and
    applying the hash algorithm to the unverified firmware component to determine a second hash value.

13. The method of claim 12, wherein determining if the first cryptographic data matches the second cryptographic data comprises the steps of:
    retrieving the digital signature value and the public key from the personality module;

decrypting the digital signature value using the public key to determine the first hash value; and comparing the first hash value to the second hash value.

14. The method of claim 13, wherein the verified firmware component comprises a first basic input/output system ("BIOS"), and the unverified firmware component comprises a second BIOS.

15. The method of claim 14, wherein applying the hash algorithm to the verified firmware component comprises applying the hash algorithm to a header file of the first BIOS, and wherein applying the hash algorithm to the unverified firmware component comprises applying the hash algorithm to a header file of the second BIOS.

16. The method of claim 13, wherein the verified firmware component comprises a first baseboard management controller ("BMC") firmware, and wherein the unverified firmware component comprises a second BMC firmware.

17. The method of claim 16, wherein applying the hash algorithm to the verified firmware component comprises applying the hash algorithm to a header file of the first BMC firmware, and wherein applying the hash algorithm to the unverified firmware component comprises applying the hash algorithm to a header file of the second BMC firmware.

18. A method for multilayered authentication of trusted platform updates, comprising:

determining first cryptographic data, wherein the first cryptographic data comprises a digital signature value corresponding to a verified firmware component;

pushing an update policy to a personality module, wherein the update policy reflects additional limitations on updates to the verified firmware component comprising at least allowable versions of upgrade updates and downgrade updates;

storing the first cryptographic data and the update policy in a personality module of an information handling system, wherein the personality module comprises information specific to a system BIOS comprising at least information related to boot order;

determining second cryptographic data using a processor in the information handling system, wherein the second cryptographic data comprises a hash value corresponding to an unverified firmware component, wherein the unverified firmware component comprises a firmware version;

determining if the first cryptographic data matches the second cryptographic data, wherein determining if the first cryptographic data matches the second cryptographic data comprises the steps of:

decrypting the digital signature value using a public key to obtain a hash value corresponding to the verified firmware component, and comparing the hash value corresponding to the verified firmware component to the hash value corresponding to the unverified firmware component; and updating firmware in the information handling system with the unverified firmware component if:

the first cryptographic data matches the second cryptographic data, the unverified firmware component includes a digital signature of a manufacturer, and the update policy allows an update to the firmware version of the unverified firmware component.

19. The method of claim 18, wherein determining first cryptographic data comprises applying a hash algorithm to at least a portion of the verified firmware component.

20. The method of claim 19, wherein determining the second cryptographic data comprises applying the hash algorithm to at least a portion of the unverified firmware component.

* * * * *